June 4, 1940.   H. F. SMITH   2,203,207
REFRIGERATING APPARATUS
Filed Sept. 24, 1937
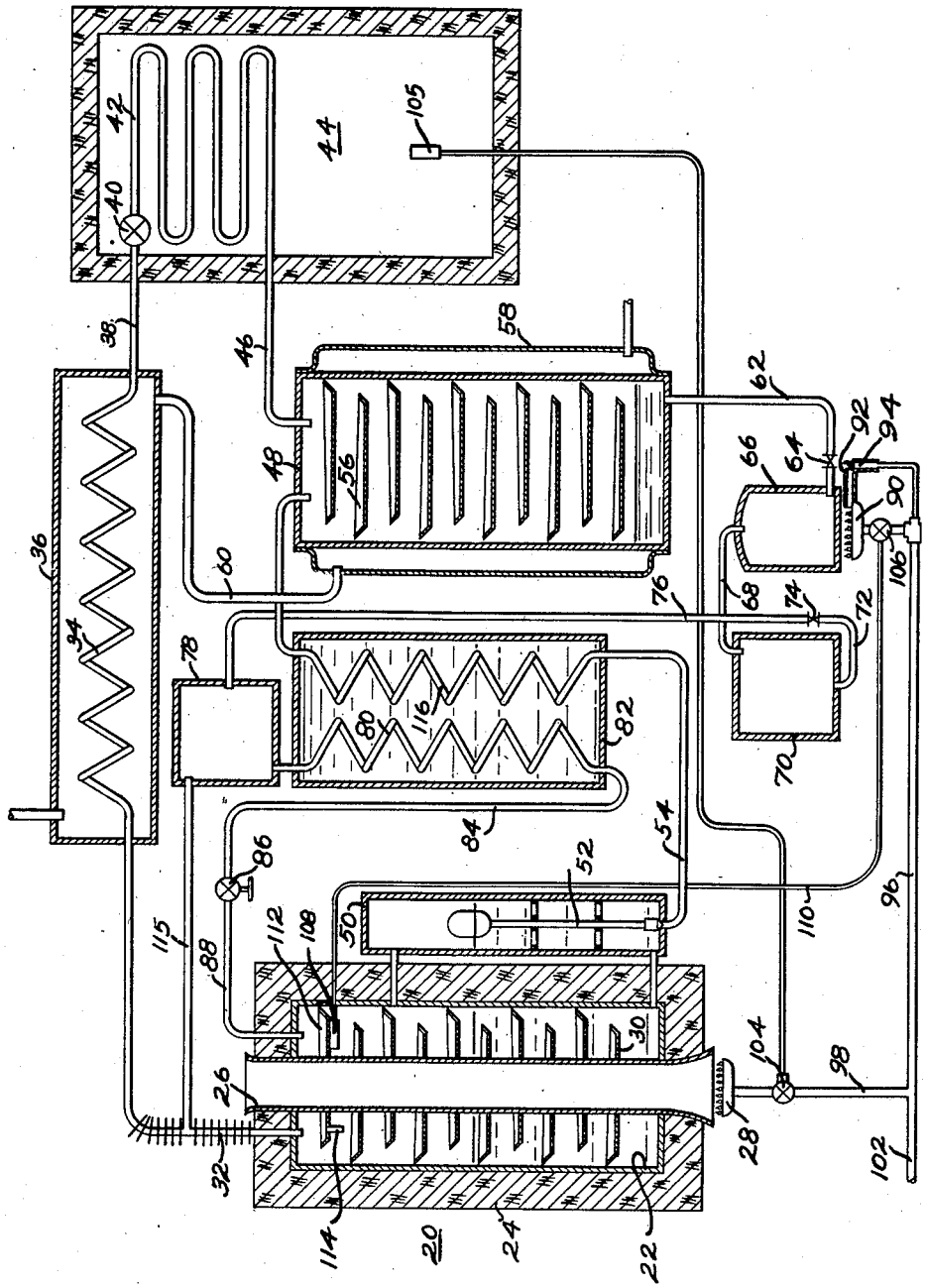
INVENTOR
Harry F Smith
BY
Spencer Hardman and Feler
ATTORNEYS Patented June 4, 1940

2,203,207

UNITED STATES PATENT OFFICE 2,203,207

REFRIGERATING APPARATUS

Harry F. Smith, Dayton, Ohio, assignor to General Motors Corporation, Dayton, Ohio, a corporation of Delaware Application September 24, 1937, Serial No. 165,549

8 Claims. (Cl. 62—5)

This invention relates to refrigerating apparatus and more particularly to absorption refrigerating apparatus of the multi-pressure type which is provided with means for forcing the rich liquor from the absorber into the generator.

In recent years, the continuous absorption system of the pressure equalized type has been quite popular because it has no moving parts. However, although this system has been diligently worked upon in order to increase the efficiency, the continuous absorption machine of the multi-pressure type is much superior in efficiency. The difficulty has been that a pump was required in order to pump the rich liquor from the absorber which is at evaporator pressure to the generator which is at condenser pressure. Such pumps introduced moving parts into the system and required mechanical energy, while the generator merely required heat energy.

It is an object of my invention to provide a continuous absorption machine of the multi-pressure type in which a means and process substantially without moving parts and requiring no mechanical energy is provided for forcing the rich liquor from the absorber into the generator.

It is another object of my invention to provide a trap for receiving rich liquor from the absorber, which liquor can, by the application of heat, be employed to force the rich liquor so collected into the generator.

It is another object of my invention to provide a novel type of means for controlling the forcing of the rich liquor from the absorber into the generator.

Further objects and advantages of the present invention will be apparent from the following description, reference being had to the accompanying drawing wherein a preferred form of the present invention is clearly shown.

In the drawing:

The figure is a diagrammatic representation of an absorption refrigerating system embodying my invention.

In the drawing there is shown a generator 20 comprising a casing 22 surrounded by insulation 24. Extending through the generator from top to bottom is a metal flue 26 having a gas burner 28 located at the mouth of the flue. Surrounding the flue 26 and in heat exchange relation therewith are a plurality of pans 30 which also serve as baffles for fostering the vaporization of the ammonia from the strong liquor in the generator and at the same time preventing the carrying of water along with the ammonia. Extending out of the top of the generator is a conduit 32 which is coiled as shown at 34 to form a condenser within a water jacket 36. The ammonia vapor passes through this conduit 32 into the condenser 34 where it is condensed and this ammonia liquor passes from the condenser 34 to a conduit 38 to an expansion valve or restrictor 40 which controls the flow of ammonia liquor into the evaporating means 42 which is located within a chamber or compartment 44 to be cooled.

The ammonia liquid evaporates within the evaporator 42 under reduced pressure, and this evaporated refrigerant is conducted through the conduit 46 into the top of the absorber 48. At the side of the generator is a float chamber 50 containing the float valve 52 which controls the flow of weak liquor from the generator through the conduit 54 into the top of the absorber 48. The absorber 48 is provided with staggered shallow pans 56 for receiving the weak liquor which is forced from the bottom of the generator by the pressure in the generator under the control of the float valve 52.

The shallow pans filled with weak liquor provide a large liquid surface with which the evaporated refrigerant discharged from the evaporator 42 may come in contact. The absorber is provided with a water jacket 58 and water is forced into the bottom of this jacket and removed from the top of the jacket by a conduit 60 which discharges the cooling water into the condenser jacket 36 for condensing the ammonia vapor. The presence of the weak liquor spread over a large surface and cooled in an atmosphere of ammonia vapor causes the absorption of the ammonia vapor by the weak liquor and the liquor absorbs more and more ammonia as it spills over from one pan to another and finally collects at the bottom of the absorber in the form of rich or strong liquor.

In order to maintain a supply of rich liquor in the generator, it is necessary to take the rich liquor from the bottom of the absorber and force it back into the generator which is kept at condensing pressure. Heretofore, some form of mechanical means has been used for forcing this rich liquor into the generator. However, the presence of moving parts within an absorbing system is always objectionable to a certain extent, and the pumps, which were used, required a source of mechanical or electrical power. In order to overcome this objection, I have provided a heat operated pumping means in the form of a trap which collects the liquor from the absorber, and by heating the trap a portion of the ammonia in the rich liquor is vaporized to force the remainder of the rich liquor into the generator.

Therefore, I have provided a conduit 62 provided with a check valve 64 immediately before entering the bottom of one of the vessels 66 of the trap. The top of this vessel 66 is connected by a tube 68 with the top of a second vessel 70. The bottom of this second vessel 70 is provided with a pipe 72 having a check valve 74 connected by another pipe 76 to the mid-portion of a third vessel 78. The bottom of this third vessel 78 is connected by a spiral tube 80 passing through the jacket of the heat interchanger 82 and having a pipe portion 84 extending upwardly above the generator-absorber to an adjusting valve 86 which controls the flow of fluid through the pipe 88 which extends downwardly through the top of the generator and has its mouth over the upper pan in the generator. It should be noted that the portion of the pipe having the valve 86 is above the mouth of the pipe 88 so that it is necessary that the liquid in the third vessel 78 rise above the level of the valve 86 before liquid will flow from the third vessel 78. The mouth of the pipe 88, however, is below the bottom of the third vessel 78 so that when the liquid flowing from the third vessel 78 into the generator 20 is started, it will continue until the third vessel is emptied. A pipe 115 is provided to vent the third vessel 78.

The vessel 66 is heated by a gas burner 90 provided with a flash tube 92 and a pilot light 94 away from the vessel 66 for lighting the burner 90. The burner 90 as well as the pilot light is supplied with gas through the pipe 96 while the burner 28 is supplied with gas through another pipe 98 which connects to a common source of gas 102. The pipe 98 is provided with a valve 104 controlled by the temperature of the thermostat bulb 105 located in the compartment 44 to be cooled, for properly regulating the amount of gas supplied to the burner 28.

The burner 90 is controlled by a gas valve 106 independently of the valve 104 by a thermostat bulb 108 which is connected to the valve 106 by the tube 110. The thermostat bulb 108 is mounted in heat exchange relation with the bottom of the top pan in the generator. This top pan 112 has an outlet 114 for draining the pan. When the pan is empty, the pan becomes hot because it is in heat exchange relationship with the metal flue 26 and thus approaches the temperature of the burnt fuel gases in the flue. This heats the thermostat bulb 108 sufficiently to open the valve 106. This causes gas to flow to the burner 90 and this burner is lighted by the pilot light 94 which burns constantly.

The burning of the gas from the burner 90 beneath the vessel 66 causes vaporization of some of the ammonia in the rich liquor. The rich liquor fills both vessels 66 and 70 by gravity since both are at a lower level than the absorber 48. When the vessel 66 is heated, ammonia vapor will pass through the pipe 68 and will collect in the top of the vessel 70 forcing the rich liquor toward the bottom of the vessel 70 and out of the vessel through the pipe 72 past the check valve 74 and through the pipe 76 into the third vessel 78. During the heating of the vessel 66 by the burner 90, the check valve 64 prevents the rising pressure within the vessel 66 from forcing the rich liquor back into the absorber 48.

The valve 106 permits the gas to flow to the burner 90 until sufficient liquid has been forced up into the third vessel 78 to cause liquid to flow through the pipe 88 onto the pan 114. This rich liquor falls onto the pan 112 at a more rapid rate than the outlet 114 can drain the pan 112, thus causing the pan to fill and overflow, thereby cooling the thermostat 108 and causing the valve 106 to close. The liquid will then flow out of the third vessel into the upper pan 112 at a rate which is determined by the opening of the valve 86. As long as the liquid from the third vessel flows into the upper vessel, the thermostat 108 will be kept cool, but as soon as the third vessel becomes empty, the thermostat 108 will be warmed to start a new cycle. The vessel 66 will be heated and cooled intermittently in response to this heating and cooling of the thermostat 108 in order to supply the generator with sufficient rich liquor. The rich liquor which is drained from the third vessel 78 is warmed by a coil 116 in the weak liquor conduit 54 extending from the generator to the absorber. This coil 116 is located in the heat exchanger 82 along with the coil 80 in order to warm the rich liquor and cool the weak liquor.

By employing two vessels 66 and 70 for my trap, the rich liquor in the unheated vessel 70 may cool and reabsorb the ammonia liberated in the second vessel 66. Thus, by the use of the two vessels 66 and 70 which form a trap and by intermittently heating the vessel 66, I have provided a simple, economical, heat operated means for forcing the rich liquor from the absorber back into the generator.

While the form of embodiment of the present invention as herein disclosed constitutes a preferred form, it is to be understood that other forms might be adopted, all coming within the scope of he claims which follow.

What is claimed is as follows:

1. Refrigerating apparatus including a closed circuit comprising a generator, condenser, evaporator and an absorber, means for providing a pressure difference between the generator and the evaporator during the normal operation of the system, a trap for collecting rich liquor from the absorber, means for preventing the flow of fluid from the trap to the absorber, means for conducting the strong liquor from the bottom of the trap to the generator including means for preventing the flow of fluid from the generator to the trap through said conducting means, means for intermittently heating the trap to vaporize a portion of the strong liquor collected in the trap for forcing the remainder of the strong liquor out of the trap into the generator, and means controlled by the strong liquor flowing into the generator for controlling the heating of the trap.

2. Refrigerating apparatus including a closed circuit comprising a generator, condenser, evaporator and an absorber, means for providing a pressure difference between the generator and the evaporator during the normal operation of the system, a trap for collecting rich liquor from the absorber, means for preventing the flow of fluid from the trap to the absorber, means for conducting the strong liquor from the bottom of the trap to the generator including means for preventing the flow of fluid from the generator to the trap through said conducting means, means for intermittently heating the trap to vaporize a portion of the strong liquor collected in the trap for forcing the remainder of the strong liquor out of the trap into the generator, and means controlled by temperature conditions within the generator for controlling the heating of the trap.

3. Refrigerating apparatus including a closed circuit comprising a generator, condenser, absorber and evaporator for continuously generating and condensing ammonia at one total pressure and evaporating and absorbing ammonia at a lower total pressure, means for intermittently withdrawing rich liquor from said absorber during its continuous absorption of ammonia and heating each withdrawal to generate a pressure to force the rich liquor into the generator, said last mentioned means including control means responsive to the rich liquor flowing into the generator.

4. Refrigerating apparatus including a closed circuit comprising a generator, condenser, absorber and evaporator for continuously generating and condensing ammonia at one total pressure and evaporating and absorbing ammonia at a lower total pressure, means for draining rich liquor from the continuous absorber means for heating the drained rich liquor to force the rich liquor into the generator, and means responsive to temperature conditions in the generator for controlling said heating means.

5. Refrigerating apparatus including a closed circuit comprising a generator, condenser, absorber and evaporator for continuously generating and condensing ammonia at one total pressure and evaporating and absorbing ammonia at a lower total pressure, means for pumping rich liquor from the absorber into the generator, a collecting vessel in said generator separate from the main body of liquid in said generator for first receiving the rich liquor pumped into the generator, and a means responsive to the flow of rich liquor into the collecting vessel in said generator for controlling said pumping means.

6. Refrigerating apparatus including a closed circuit including a generator, condenser, evaporator and absorber, a trap located at a lower level than the absorber and connected to the absorber for receiving rich liquor therefrom, said trap being also connected with the generator, a check valve between the trap and the absorber permitting flow from the absorber to the trap but preventing the reverse flow, means for intermittently heating the fluid in said trap to force the rich liquor into the generator, and means responsive to the flow of rich liquor in the generator for controlling the heating means.

7. Refrigerating apparatus including a closed circuit including a generator, condenser, evaporator and absorber, a trap located at a lower level than the absorber and connected to the absorber for receiving rich liquor therefrom, said trap being also connected with the generator, a check valve between the trap and the absorber permitting flow from the absorber to the trap but preventing the reverse flow, means for intermittently heating the fluid in said trap to force the rich liquor into the generator, and a thermostat responsive to the temperature of the rich liquor flowing into the generator for controlling the heating means.

8. Refrigerating apparatus including a closed circuit including a generator, condenser, evaporator and absorber, a trap located at a lower level than the absorber and connected to the absorber for receiving rich liquor therefrom, said trap being also connected with the generator, a check valve between the trap and the absorber permitting flow from the absorber to the trap but preventing the reverse flow, means for intermittently heating the fluid in said trap to force the rich liquor into the generator, and an accumulating and syphoning means for controlling the flow of said rich liquor into the generator.

HARRY F. SMITH.